United States Patent [19]

Kaplan et al.

[11] Patent Number: 5,446,891
[45] Date of Patent: Aug. 29, 1995

[54] SYSTEM FOR ADJUSTING HYPERTEXT LINKS WITH WEIGHED USER GOALS AND ACTIVITIES

[75] Inventors: Craig A. Kaplan, Santa Cruz; James R. Chen, Saratoga; David C. Fallside, San Jose; Justine R. Fenwick, Santa Cruz; Mitchell D. Forcier, Walnut Creek; Gregory J. Wolff, Mountain View, all of Calif.

[73] Assignee: International Business Machines Corporation, Armonk, N.Y.

[21] Appl. No.: 333,082

[22] Filed: Nov. 2, 1994

Related U.S. Application Data

[63] Continuation of Ser. No. 841,965, Feb. 26, 1992, abandoned.

[51] Int. Cl.⁶ ............................................. G06F 17/30
[52] U.S. Cl. ............................ 395/600; 364/DIG. 1; 364/282.2; 364/282.3; 364/274
[58] Field of Search ........................................ 395/600

[56] References Cited

U.S. PATENT DOCUMENTS

| | | | |
|---|---|---|---|
| 4,905,163 | 2/1990 | Garber at al. | 364/513 |
| 4,912,648 | 3/1990 | Tyler | 395/61 |
| 4,982,344 | 1/1991 | Jordan | 364/521 |
| 4,992,972 | 2/1991 | Brooks et al. | 364/DIG. 2 |
| 5,021,976 | 6/1991 | Wexelblat et al. | 395/159 |
| 5,123,057 | 6/1992 | Verly et al. | 382/37 |
| 5,220,640 | 6/1993 | Frank | 395/2 |
| 5,241,620 | 8/1993 | Ruggiero | 395/22 |
| 5,241,645 | 8/1993 | Cimral et al. | 395/500 |
| 5,263,167 | 11/1993 | Conner, Jr. et al. | 395/700 |
| 5,297,249 | 3/1994 | Bernstein et al. | 395/156 |

FOREIGN PATENT DOCUMENTS

| | | |
|---|---|---|
| 04441089 | 8/1991 | European Pat. Off. . |
| 0451384 | 10/1991 | European Pat. Off. . |
| WO9001190 | 2/1990 | WIPO . |

OTHER PUBLICATIONS

Friese, From Text to Hyper text, BYTE, Oct. 1988, pp. 247–253.

Hirohiko Mori et al, "An Adaptive Document Retrieval System Using a Neural Network", International Journal of Human-Computer Interaction, vol. 2, No. 3, pp. 267-280, 1990.

A. R. Hurson et al., "Neural Network-Based Decision Making for Large Imcomplete Databases", PARLE '91 Parallel Architectures and Languages Europe, vol. 1: Parallel Architectures and Algorithms, Eindhoven, The Netherlands, Jun. 10-13, 1991, Proceedings, Springer-Verlag, New York, 1991, pp. 321-337.

K. S. Natarajan et al, "Adaptive Context-Dependent Decision Making", IBM Technical Disclosure Bulletin, vol. 29, No. 10, pp. 4468–4471, Mar. 1987.

W. C. Bulko et al, "Intelligent Context-Sensitive Help", IBM Technical Disclosure Bulletin, vol. 33, No. 6B, pp. 143-144, Nov. 1990.

J. Stanford, "VM Intelligent Command Generator", IBM Technical Disclosure Bulletin, vol. 33, No. 5, p. 75, Oct. 1990.

M. Felder et al, "Dynamically Built Hypertext Link

(List continued on next page.)

*Primary Examiner*—Thomas G. Black
*Assistant Examiner*—Wayne Amsbury
*Attorney, Agent, or Firm*—Baker, Maxham, Jester & Meador

[57] ABSTRACT

A smart hypermedia system that acquires user characteristics either directly or inferentially. Simple associative networks serve to model user profiles, including relationships between user goals and the hypermedia information nodes. Hypermedia links to other nodes are recommended by ranking a link list in an order that depends on one or more user profiles containing information relating to users' goals and interests. Users can teach the system directly by rearranging the order of suggested links on the list. The system can also learn indirectly by observing how long and in what sequence the user views each hypermedia information node. User profiles can be combined to form group profiles and may be dynamically and continuously updated to form an adaptive system profile. The two system learning modes may be simultaneous or disjoint.

29 Claims, 5 Drawing Sheets

OTHER PUBLICATIONS

Structure", IBM Technical Disclosure Bulletin, vol. 32, No. 6B, pp. 103–104, Nov. 1989.

M. Rimball et al, "Intelligent Help for CACE Applications", IFAC 11th Triennial World Congress, Tallin, Estonia, USSR, 1990, Proceeding, pp. 367–372.

J. Finlay et al, "Neural Networks in Human–Computer Interaction: A View of User Modelling", Department of Computer Science, University of York, Heslington, York, United Kingdom, YO1 5DD.

| TOPIC → <br><br> TOPIC ↓ | VEGETARIANISM | SURFING | NUTRITION | STEEL-WORKING |
|---|---|---|---|---|
| Vegetarianism | × | 3 | 10 | 1 |
| Surfing | × | × | 5 | 1 |
| Nutrition | × | × | × | 4 |
| Steel-Working | × | × | × | × |

*FIG. 1*

| TOPIC → <br><br> GOAL ↓ | VEGETARIANISM | SURFING | NUTRITION | STEEL-WORKING |
|---|---|---|---|---|
| Learning about California Lifestyles | 10 | 7 | 10 | 2 |
| Get Healthy | 5 | 10 | 2 | 1 |
| Find a job in Pittsburgh | 1 | 3 | 1 | 10 |

SYSTEM FOR ADJUSTING HYPERTEXT LINKS WITH WEIGHED USER GOALS AND ACTIVITIES

CROSS-REFERENCE TO RELATED APPLICATIONS

This is a 37 CFR§1.62 File-Wrapper Continuation of parent application Ser. No. 07/841,965 filed on Feb. 26, 1992 and now abandoned.

BACKGROUND OF THE INVENTION

1. Field of the Invention

The present invention relates to user interface techniques for reorganization of retrieved documents and, more particularly, to an intelligent hypermedia system that adapts dynamically to the user.

2. Discussion of the Related Art

Hypermedia systems that allow the user to navigate through large amounts of on-line information are known to be a promising method for controlling the overwhelming increase in information available to the user. While most paper documents lead the user down a rigid sequential path, hypertext documents provide users with a means to choose one of many different paths. Hypercards provide a useful access method to simple databases, and other hypermedia are also known.

Hypertext is a familiar term used to describe a particular form of organization and user presentation of information within a computer-implemented system and is a familiar element of the broader class of systems referred to herein as hypermedia. Hypermedia exploit the computer's ability to link together information from a wide variety of sources as a tool for exploring a particular topic. Such systems embrace large numbers of "data objects", which can be panels of text, titles, index entries or other data such as images, graphical tables, video or sound information, and so forth. The data object is said to reside at a "node" and may vary in size and type. A collection of such data objects is denominated a hypermedium. For data objects limited to text panels, that is, blocks of text data of varying size, the collection is referred to as a hypertext document.

Each data object is essentially self-contained but may contain references to other such objects or nodes. Such references are normally used in a hypertext document and are referred to as "links". A link is a user-activated control reference that causes the data object at the link target node to be displayed. Normally, hypertext systems are window-based and the newly displayed object appears in a new window. The new object or panel may, of course, contain additional links to other such panels. By following these links from panel to panel, the user "navigates" through and about the hypertext document. This scheme provides user-control over the order of information presentation and permits the user to select what is of interest and how to pursue a given topic.

Thus, a hypertext document essentially consists of a set of individual data objects or nodes interconnected by links. Each link is a relation between two nodes. The link relation includes data relating the location of the first panel where the link starts and the location of the second panel that is the target. Such location information may be stored in various forms, for example, it may be in the form of byte offsets indicating the number of bytes from the start of a file.

The set of link data for a given view of a hypermedium is known in the art as a link matrix and is denominated a link "profile" herein. Each such link profile contains a unique link vector or list for every node in the hypermedium. Each link vector is a list of the links between the corresponding "originating" node and other "target" nodes. The aggregate of such vectors, one for each node, makes up one link profile for the hypermedium.

In U.S. Pat. No. 4,982,344, Daniel S. Jordan discloses a data processing system that incorporates a method for accelerating the creation of such link vectors. Reference is made to Jordan's disclosure for a general understanding of object-oriented hypermedia systems. Reference is made to B. Shneiderman, *Hypertext: Hands On!*, Addison-Wesley Publ. Co., (1989), for a general background discussion of the hypertext concept. For a more introductory treatment, reference is made to J. Conklin, "Hypertext: An Introduction and Survey", *IEEE Computer*, Vol. 20, pp. 17–41, (1987).

Those familiar with the art are aware of the fundamental questions that still exist regarding how to direct the user to the information actually desired within a hypertext document. For example, consider the problem of writing a hypertext document for an unknown or potentially diverse audience. A link profile that might be useful for one type of user could be confusing to other users with different backgrounds or different objectives. Ideally, the hypertext document would adapt to different groups of users, providing different link profiles for different groups. But no effective adaptation methods were suggested in the art until now.

A related problem is the well-known trade-off between flexibility and complexity. In a hypertext document, the information (data object) at every panel node is associated with other panels throughout the document by means of a link profile containing many link vectors. The number of such associations from any given panel is potentially equal to the total number of such panels and, by allowing users to choose where to next jump, a greater number of link vectors provides more flexibility to an otherwise rigid process. However, as the number of link vectors grows, choosing where to next jump becomes a more complex problem for the user.

Compounding the problem of too many choices, are the other well-known hypertext issues such as becoming lost in hyperspace, not knowing what panel is targeted by a link before reaching it, and losing the organizational benefit of traditional sequential text. The Conklin reference cited above discusses these issues in detail. The negative effects of such problems can be avoided if the user is somehow guided to the correct link choices.

The existing art minimizes these problems by constraining the available choices in linking from one panel to another. This is done by providing only a few carefully chosen links to and from each panel. Thus, users are less likely to get lost or waste time exploring irrelevant nodes, but lack flexibility.

For example, it is possible that a user interested in a taco recipe may also be interested in trips to Mexico, food industry politics, the process of grinding corn by hand, and the Spanish Conquistadors. These and more topics can all be associated with tacos. Incorporating all such links in a hypertext document increases the system flexibility but also may confuse and frustrate the user.

One possible solution is to provide a great number of possible links, maximizing flexibility, while also discouraging certain links, effectively constraining the available choices. The user is then free to ignore system recommendation but may also follow them to minimize the risk of viewing irrelevant information. In the taco example, this could mean allowing the user to specify the slant or "task goal" desired in the review of tacos (e.g., the history of tacos, the market for tacos, taco recipes, etc.). However, nothing in the art suggests or teaches a suitable method for modifying a link profile in response to user-specified task objectives.

The typical hypertext link profile is predetermined according to the system designer's understanding of the typical user profile and is incorporated in the hypertext document with no provision for modification or weighted recommendation. The user model for a link profile is usually a simple matrix of ones and zeros relating each hypertext node or panel to all other such panels. Each link element is either zero (unlinked) or unity (linked), depending on the choices made by the author in view of the "connectedness" or relatedness between the panels.

Intelligent tutoring systems known in the art face a similar dynamic modification problem. Such systems must model not only the information to be taught to the user but also any mistakes likely to be made by the student user. Often, fairly complex rule-based expert systems are employed for this modelling. A wide range of sophisticated models are known in the art and reference is made to M. P. Anderson, et al., "Empirical User Modeling: Command Usage Analyses for Deriving Models of Users", *Proceedings of the Human Factor Society—31st Annual Meeting*, Vol. 31, pp. 41–45 (1987) for a discussion of the related art. Reference is also made to D. Carlson, et al., "HyperIntelligence: The Next Frontier", *Communications of the ACM*, Vol. 33, pp. 311–321 (1990). Reference is further made to R. Kass, et al., "The Role of User Models in Cooperative Interactive Systems", *International Journal of Intelligent Systems*, Vol. 4, pp. 81–112 (1989). Finally, reference is made to A. P. Norcio, et al., "Adaptive Human-Computer Interfaces: A Literature Survey and Perspective", *IEEE Transactions on Systems, Man, and Cybernetics*, Vol. 19, pp. 399–408 (1989). These references provide a general background of the user modelling and adaptive man-machine interface arts, which generally embrace models too complex for practical application to hypermedia systems.

Thus, there appears to be a need in the art for an adaptive user interface simple enough for effective use in hypermedia systems, permitting a hypertext document to be adapted to various users without losing the efficiency and flexibility associated with the hypertext technique. The related unresolved problems and deficiencies are keenly felt in the art and are solved by the present invention in the manner described below.

SUMMARY OF THE INVENTION

The present invention resolves the above problems by adding several new user-interface features to a combined hypermedia system, thereby obtaining unexpected and beneficial results. The first such feature is the incorporation of links between all nodes within a hypermedium. Existing hypertext documents provide from one to five links from an originating node to other target nodes, reflecting decisions of the document author as to how nodes should be interrelated.

The second feature of this invention avoids overwhelming the user with choices by introducing the concept of graduated link-weight values for ordering the linked nodes in a list so that the most relevant link targets appear first in a list presented to the user.

The third feature of this invention introduces a new type of link matrix, heretofore unknown in the art. The link matrix known in the art may be viewed as a set of vectors, each being a list of zero and unity link values relating each node to a few other nodes. The new type of link matrix of this invention is a set of link-weights relating the existing set of hypertext panel nodes to a new set of user goals. The set of user goals may also be considered as new hypertext nodes containing only a brief title and being linked to all other nodes. As with the panel-to-panel link matrix, every user goal is linked to all hypertext panel nodes. However, user goals need not be linked to one another, although they may be. A selected user goal and a selected panel are together denominated herein a user "context". Each such "context" corresponds to a unique set of link vectors.

As a fourth feature, to recommend target panels to a user, the method of this invention introduces a relative link-weight value representing the link between each panel node and all other panel nodes in the hypertext document. A relative link-weight value is also introduced to represent the strength of the relationship between the user goals and the various panel nodes in the document. The methods of this invention employ associative networks or matrices as a simple and highly effective means of representing these relationships. Associative matrices are simplified semantic networks, similar to the "neural networks" known for modelling relationships in information systems and human memory.

The present invention employs a first topic-to-topic (panel-to-panel) associative matrix and a second goal-to-topic associative matrix, and provides for the capability to combine linkage information from multiple matrices to arrive at a single set of recommendations in the form of a "user profile". Theoretically, other such associative matrices may be added to the system, but the two associative matrices disclosed herein have unexpectedly been found to provide adaptability sufficient for the objects of this invention.

A fifth feature of this invention introduces learning capability. A known practice is to interview a representative sample of system users to determine their collective linking preferences, incorporating such a fixed user profile in the hypertext document. This existing method can be used to determine initial link-weights for both the topic-to-topic matrix and the goal-to-topic matrix by attempting to anticipate the needs of the prospective users. This existing method alone does not permit dynamic adaptation of such associative matrices, however. The fifth feature of this invention is a self-adaptive or learning feature for dynamically updating these link-weight values in each associative matrix.

Two learning methods are introduced by this invention. The first is an inferential method for acquiring user information without any effort or attention from the user. The inferential method measures the time that a user views a particular "data object" or panel node and adjusts the linkage weight to that panel node accordingly. The linkage weight to that target panel may also be scaled to compensate for the length of time required to read the panel, which is proportional to the amount of text data in the panel.

The second learning method is active. The user can manually adjust a link-weight value to correct it in situations where a panel is held onscreen during a coffee break without an attentive user or when a brief panel is deemed uninteresting. Thus, both automatic and manual methods for acquiring user profile information or characteristics are introduced in this invention. The hypermedia system of this invention incorporates both direct and inferential modes of learning.

Finally, a sixth feature of this invention is that many different "user profiles" may be accumulated and stored for later access by individual users having different interests. Moreover, the methods of this invention include unexpectedly simple and useful procedures for merging selected user profiles to form one or more general user-group profiles and for accumulating new user profiles over time to form a cumulative or adaptive system profile. These procedures are quite simple and their effect is wholly unexpected and beneficial.

The foregoing, together with other features and advantages of the present invention, will become more apparent when referring to the following specification, claims and accompanying drawings.

BRIEF DESCRIPTION OF THE DRAWINGS

For a more complete understanding the present invention, reference is now made to the following detailed discussion of the embodiments illustrated in the accompanying drawings, wherein.

DETAILED DESCRIPTION OF THE PREFERRED EMBODIMENTS

The Goal-To-Topic Associative Matrix:

This invention combines several different simple associative connection networks with a hypermedia system in a new manner, to permit the dynamic modelling of hypermedia user profiles. These user profiles are collections of link-weight vectors or link-weight matrices used to select links to priority nodes by examining the rank ordering of the lists (vectors) of potential links. The ordering of a recommendation list depends upon the user profile, which consists of two associative matrices of link-weights that relate topics to topics and goals to topics. The user can actively teach the system by rearranging the order of suggested node links.

Figure 1:
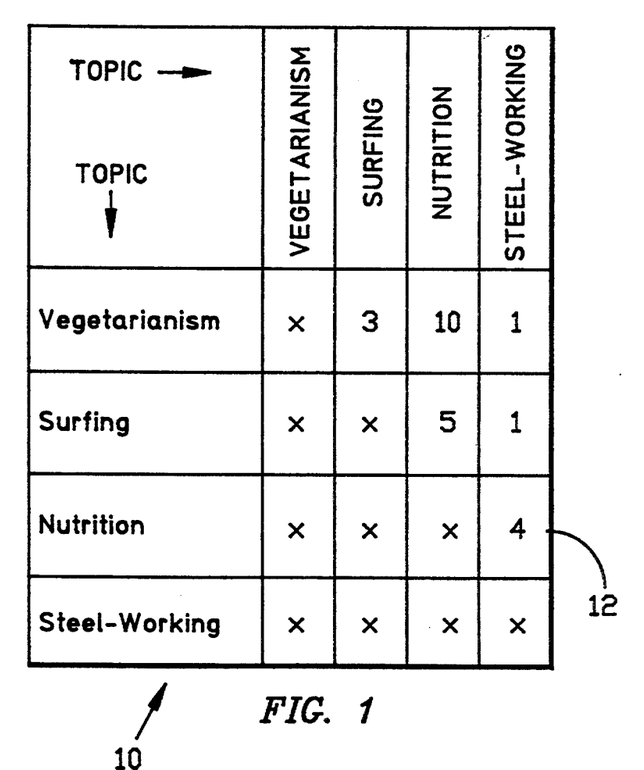
FIG. 1 provides an illustrative topic-to-topic associative matrix.

FIG. 1 shows an associative matrix 10 that captures the relationship between any topic in a hypertext system to any other topic. The link-weights, exemplified by link-weight 12, can be established by the hypertext document designer as fixed values to accomplish some objective. For example, the illustrative link-weights shown for matrix 10 in FIG. 1 indicate that vegetarianism is more strongly associated to nutrition than it is to surfing. A hypertext system can use the information in matrix 10 to suggest that a user currently reading about vegetarianism should next consider nodes related to nutrition rather than nodes related to surfing or steel working.

But suppose the reader is interested in California lifestyles. Then it would be appropriate for the system to recommend linkage from vegetarian to surfing, for that particular user. To capture this additional user knowledge, the method of this invention introduces another type of associative matrix that relates any topic in a hypertext system to any one of several user goals. This second associative matrix 14 is shown in FIG. 2.

Figure 3:
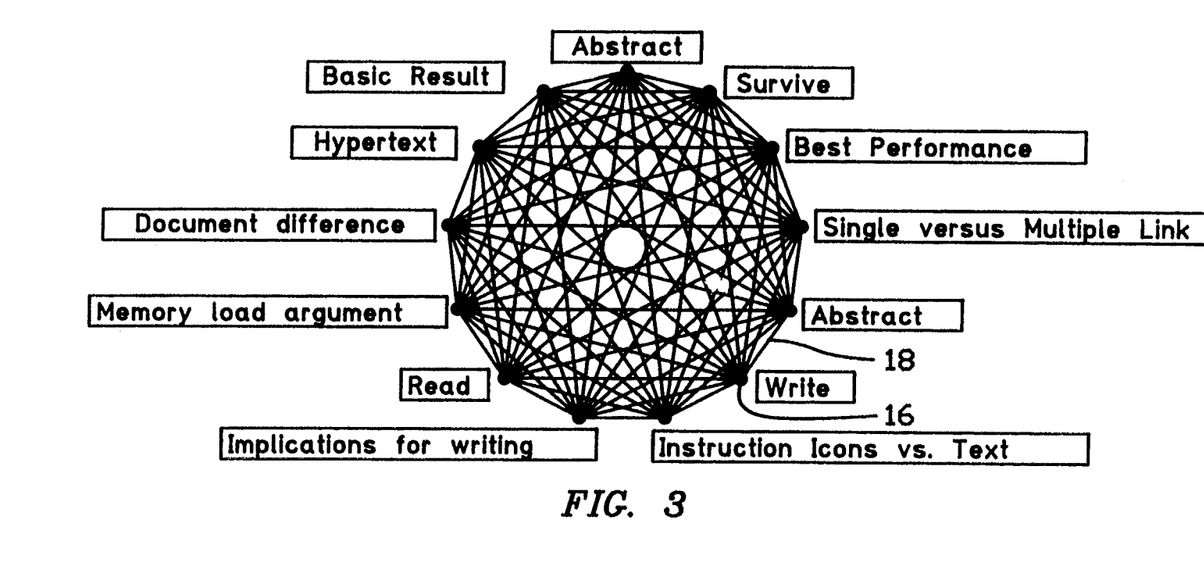
FIG. 3 illustrates the connectionist network used in an illustrative embodiment of this invention.

FIG. 3 shows a hypertext connectionist network illustrative of that used by the inventors in a simulation experiment for the system of this invention. Note that each node, exemplified by node 16, is joined to all other nodes by links, exemplified by link 18. Hypermedia in general consist of nodes or panels (cards, topics, etc.) of information that are connected to one another by links. Hypermedia systems permit the user to jump, or link, from the current node to any other connected node. The method of this invention provides links between each node to all other nodes and also provides graduated link-weight values for each link to prioritize the other nodes, thereby preventing the unlimited options from overwhelming the user. The ordering of the link-weight vector values for a-single node reflects knowledge of both the user's current goals or context and the user's past choices.

In the example shown in FIG. 1, the number of link-weights in matrix 10 is less than the square of the number of topics in the hypertext document as a result of an assumed redundancy of the linkages represented by X in FIG. 1. If desired, the link-weight between surfing and nutrition may be valued differently from that between nutrition and surfing. That is, the linkages between topics may reflect the direction of topic transition.

Figure 2:
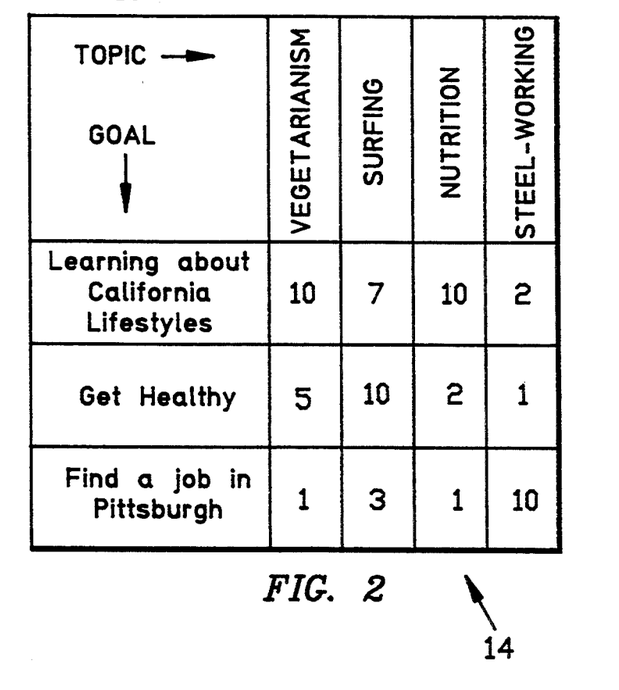
FIG. 2 provides an illustrative goal-to-topic associative matrix.

Matrix 14 in FIG. 2 represents the association between specified user interests or goals and the topics in the hypertext system. Using the illustrative link-weights shown for matrix 14, the system of this invention would recommend both surfing and vegetarianism to a user interested in California lifestyles. Theoretically, as many such associative matrices as desired may be added to the system of this invention. There are many prospectively useful schemes for combining the information from such associative matrices to arrive at a single set of recommendations. A simple method preferred for this invention is described hereinbelow.

Thus, the methods of this invention use simple associative matrices to establish a user profile containing the link-weight values relating each topic in the hypertext system to all other topics in the same document.

System Learning Techniques:

The second discovery leading to this invention is the addition of simple neural network learning techniques to this associative matrix model. These learning techniques for dynamically modifying the hypertext user profile permit the system to link from each topic to all other topics without overwhelming the user with too many choices. Constraining the user model to the two associative matrices described above does not alone restrict how the link-weights are evaluated. The standard practice in the art for evaluating hypertext linkages is to perform knowledge engineering.

For example, a representative sample of system users is interviewed and their collective linking preferences established. In this invention, common user goals could be thus defined and incorporated into matrix 14, which relates goals to topics. Practitioners in the hypertext system art use such an approach in establishing which links to exclude from the system. Such practitioners must attempt to anticipate the needs of their respective users and are obliged to compromise when such needs are self-conflicting. A knowledge engineering approach works well in determining an initial set of link-weights for matrices 10 and 12 but does nothing to suggest useful learning techniques.

One reason that simple link matrix models are preferred for this invention is that each link-weight value can be easily and dynamically updated to implement a self-adaptive or learning system. Reference is made to P. R. Innocent, "Towards Self-Adaptive Interface Systems", *International Journal of Man-Machine Studies*, Vol. 16, pp. 287–299 (1982) for the background of the self-adaptive system apt.

Consider, for example, if a company,s annual report is put on-line in a hypertext system, a financial analyst would want to proceed directly to the financial statistics and would also be interested in any other scattered information affecting the company's bottom line. An environmental group reading the same report would be interested in all references to environmental measures, wherever they may be. The author of the initial hypertext annual report cannot reasonably anticipate all of the various ways in which different audiences may wish to view the information. The method of this invention includes simple associative matrix combining procedures to "learn" new sets of recommendations for these different users.

Simple models have tremendous advantages in a learning environment. Not only is it easy to update knowledge represented as a matrix of numbers, but it is also easy to merge such knowledge using simple mathematical operations such as simple arithmetic averaging of the preferences of a set of users. Individual user profiles are easy to create and could be shared over a networked system, facilitating transfer of such information. With a learning system, each user becomes a source of expertise for the system and, with an ability to pool from many sources of expertise, it becomes possible to create a reservoir of experience and knowledge that is not practically available from traditional knowledge engineering methods.

The first learning method of this invention is an inferential method where the system learns by observing the behavior of the user and making inferences in accordance with these observations. For a general discussion of adaptive learning techniques, reference is made to D. Browne, et al. (Eds.), *Adaptive User Interfaces*, Harcourt Brace Jovanovich, London (1990). The second learning method of this invention is the direct teaching method, where the user forces changes to the link-weight values in matrices 10 and 14 by direct revision of topic priorities from the keyboard.

The inferential approach has the advantage that the user need not act to cause the system to learn, but also introduces the related risk of incorporating false inferences about user behavior. The direct teaching approach obliges the user to provide explicit feedback, adding a teaching task to whatever other user tasks exist, but the system will tend to learn correctly during the first iteration. The methods of this invention incorporate both direct and inferential modes of learning to accommodate requirements for accuracy and minimal user activity. The preferred embodiment of these methods is implemented as part of the HYPERFLEX embodiment discussed hereinafter.

The connectionist network (FIG. 3) model leads to an unexpectedly and advantageously elegant inferential learning technique based on simple associative matrix (neural) principles. The inferential learning method of this invention differs from the typical approach in the art, which uses an algorithm (such as back-propagation) to train the network. Such conventional training can require many thousands of cycles during which samples from a "training set" are presented and feedback is given to the system. When such a "neural" model has learned a training set, it is then usually treated as a black box or an expert system expected to generalize to new situations that may-be similar to the training set examples. Reference is made to J. L. McClelland, et al., *Parallel Distributed Processing: Explorations in the Microstructure of Cognition*, Vol. 2; *Psychological and Biological Models*, MIT Press, Cambridge (1986), for discussions of this learning and training approach.

Early System Learning Experiments:

The inventors performed experiments with an early, non-learning, version of the system of this invention. These experiments demonstrated the power of using recommendations based on goals in the manner disclosed above in connection with FIG. 2. Users were, on average, 36% faster in locating answers to questions when they used goal-based recommendations typified by goal-topic matrix 14 in FIG. 2, compared with a standard version typified by topic-topic matrix 10 in FIG. 1. Users also searched 28% fewer panels and were 10% more accurate when using the goal-based recommendations.

The inventors also conducted later experiments with early learning versions of this invention to determine the effectiveness of inferential learning methods for adapting to users as they use the system. Eighteen (18) users participated in the study. Results showed that once the system of this invention is trained by a single user, all subsequent users are able to locate information 24% faster than users of the same untrained system. Adding the learning from an additional two users provided only an additional 4% improvement in access speed.

Results demonstrate that the addition of goal-topic matrix 14 in FIG. 2 containing a set of goals for even a single user provides dramatic (24%) improvement of hypertext system efficiency. As soon as any user provides some goals and teaches the system to associate these goals with the panels of information, subsequent teaching merely serves to refine the associations without significant dramatic increases in system efficiency. Presumably, retraining by a single user from another "goal-group" will suffice to prepare the hypertext document for others in the new "goal-group".

The experiments are designed according to a learning objective that is to predict the most useful panel or panels to be targeted from a particular current panel and/or user goal. Thus, "input" to the connectionist (neural) system consists of a panel node and a goal node, and the "output" consists of an ordered list of all other panel nodes in the system. The "target" is the actual panel desired by the user. "Errors" represent non-target panels that are ranked higher in priority than the actual target panel node. The error measure is designed to compare the performance of the method of this invention with the methods of earlier static hypertext systems.

Table 1 shows an early embodiment of the learning rule of this invention and compares the performance of different activation rules for a typical training set.

TABLE 1

Learning Rule:
Weights are changed on each cycle according to the following rule:
  $\delta W(c,t) = 1.0$ if t is target and c is currently active panel (previous target)
  $\delta W(c,t) = 0.5$ if t is target and c is current goal
  $\delta W(i,j) = 0$ otherwise

| | Activation Rule: | | |
|---|---|---|---|
| A(i) = | Error after one Epoch | Lowest Error Achieved | #Epochs to Lowest Error |
| 1. $A(c)W(c,i)/\Sigma_j W(c,j)$ $+ A(g)W(g,i)/\Sigma_j W(g,j)$ | .10 | .06 | 4 |
| 1a. $1/(1 + \exp(-A(i)))$ {previous with sigmoid} | .47 | .17 | 3 |
| 2. $A(c)W(c,i)/\Sigma_j W(c,j)$ $+ A(g)W(g,i)\Sigma_j W(g,j)$ $+ A(i)*D \{D=.75\}$ | .37 | .34 | 5 |
| 2a. $1/(1 + \exp(-A(i)))$ {previous with sigmoid} | .47 | .08 | 7 |
| 3. $\Sigma_n(A(n)W(n,i)/\Sigma_j W(n,j))$ $+ A(i)*D$ For all n element of {panel, goals} | .93 | .45 | 6 |
| 3a. $1/(1 + \exp(-A(i)))$ {previous with sigmoid} | .50 | .32 | 6 |

With an unordered list, users must search an average of N/2 panels (N=total number of panel nodes) to find a target. The error measure is P/(N/2), where P is the number of panels ranking higher than the target panel. This reflects the normalized time required to search the ordered list for the target panel. Thus, errors less than unity represent a net gain in efficiency over existing art for users of the method of this invention.

The system of this invention requires functions or rules that will allow it to properly capture and use the link-weight associations between panels. The "best" rule depends on the types of relationships existing between the panel nodes. The rules in Table 1 are known to be useful in the art for modelling human memory functions and were considered by the inventors during the development of this invention. The weights change on each cycle according to the very simple learning rule in which the link-weight between two nodes, W(A,B), begins at unity and increases by one each time that B is the target and A is the input (or by 0.5 if A is the current goal node). Essentially, this rule assumes that the more a link was used in the past, the more likely it is to be useful now. The error numbers in Table 1 are based on the assumption that the lowest error point exists when the error measure decreases less than 0.001 over successive epochs. The training set used to generate Table 1 includes four sequences of seven items each in a twenty-item connectional network.

In this invention, the activation of a node represents the likelihood that it would be relevant to the user's current situation. Activation is spread from node A to node B proportionately to link-weight W(A,B). Six different activation functions were experimentally evaluated by the inventors with the results shown in Table 1. In all cases, the activations of the current node c (representing the panel currently viewed by the user) and the current user goal g are initially set to unity.

In the simplest activation rule, Rule 1, the activation of node i, A(i), is a function of the two link-weights between A(i) and the current node c as well as the goal node g. In particular, because activation of c and g are unity by definition, the activation of i is proportional to the link-weight between c and i, W(c,i), divided by the sum of the link-weights from c to all other nodes, $\Sigma_j W(c,j)$, plus a similar term representing the sum of all link-weights from g. With Rule 1, the strength of the connections from the current node and goal determine the activations of all other nodes.

The second activation function in Table 1, Rule 2, permits each node to carry over some of its previous activation on each new cycle. The third activation function, Rule 3, spreads activation from each node on each cycle. This third rule permits groups of nodes to "reinforce" each other. Finally, each of the above three rules is recast in terms of a sigmoid or "squashing" function (Rules 1a, 2a and 3a), which forces the node activation value to remain between zero and 1.

The inventors measured the performance of these six activation rules for a twenty-node network using randomly selected training sequences. The training set included four such random sequences and each sequence started with a goal followed by seven nodes or panels. The network was trained using each node in the series as first the target and then the input for the next target. In each epoch, the network was trained once with each of the sequences and the average error was measured.

The unexpected and useful result of this experimentation by the inventors is the evidence in Table 1 that the simplest activation rule provides the best overall results. With Rule 1, the network learned quickly, reducing the error to 0.1 after the first pass through a training set. It achieved the lowest error overall (0.06) after only four epochs. This error rate suggests that the theoretical user of the adaptive interface represented by Rule 1 would spend as little as 6% of the search time that would be required by a user of an identical non-adaptive system.

The particular panel-to-panel transitions are the most important relationships for the training set. The network is essentially learning transition probabilities using the user goal node weights as a biasing term. There may be other environments that would favor another of the activation functions in Table 1, such as situations in which second order effects are important. For example, a second order effect is represented where panel D is relevant only after reading both panels B and C.

The learning difficulty of a sequence can be roughly determined in terms of its branching factor, which is the number of nodes branching from each source node. The branching factor is indirectly influenced by the number of nodes in the network, the number of distinct sequences and the number of nodes per sequence. The inventors have conducted simulated experiments in which these parameters were varied and have unexpectedly discovered that excellent learning almost always occurs during the first epoch. Such excellent learning is defined as 70% to 90% reduction in the error measure. Moreover, as network capacity is increased by increasing the branching factor, the error measure was found to increase only gradually and predictably. Accordingly, the inventors developed a new, simpler "rank-ordering" learning rule discussed hereinafter, which is the preferred learning rule for the method of this invention.

These unexpected results and discoveries suggest that the adaptive system of this invention is useful with either a new user or the user by whom the system was trained for the same task. This invention is also useful for the same user involved in new tasks. However, a new task for a new user will not be simplified by using the method of this invention because no system learning has occurred relative to either the task or the user.

The preferred embodiment of this invention incorporates a simple "rank-ordering" inferential learning method that is an automatic learning technique that creates associations between a user goal or link panel selected by the user and any subsequent panels visited by the user. The strength of these associations is increased in direct proportion to the amount of time the user spends viewing each panel. Because some panels contain more text than others, a normalized measure of time per line of text is preferred. This preferred method provides link-weight values for ranking the target panels in order and is better understood with reference to FIGS. 7–8 and the following discussion.

Figure 4:
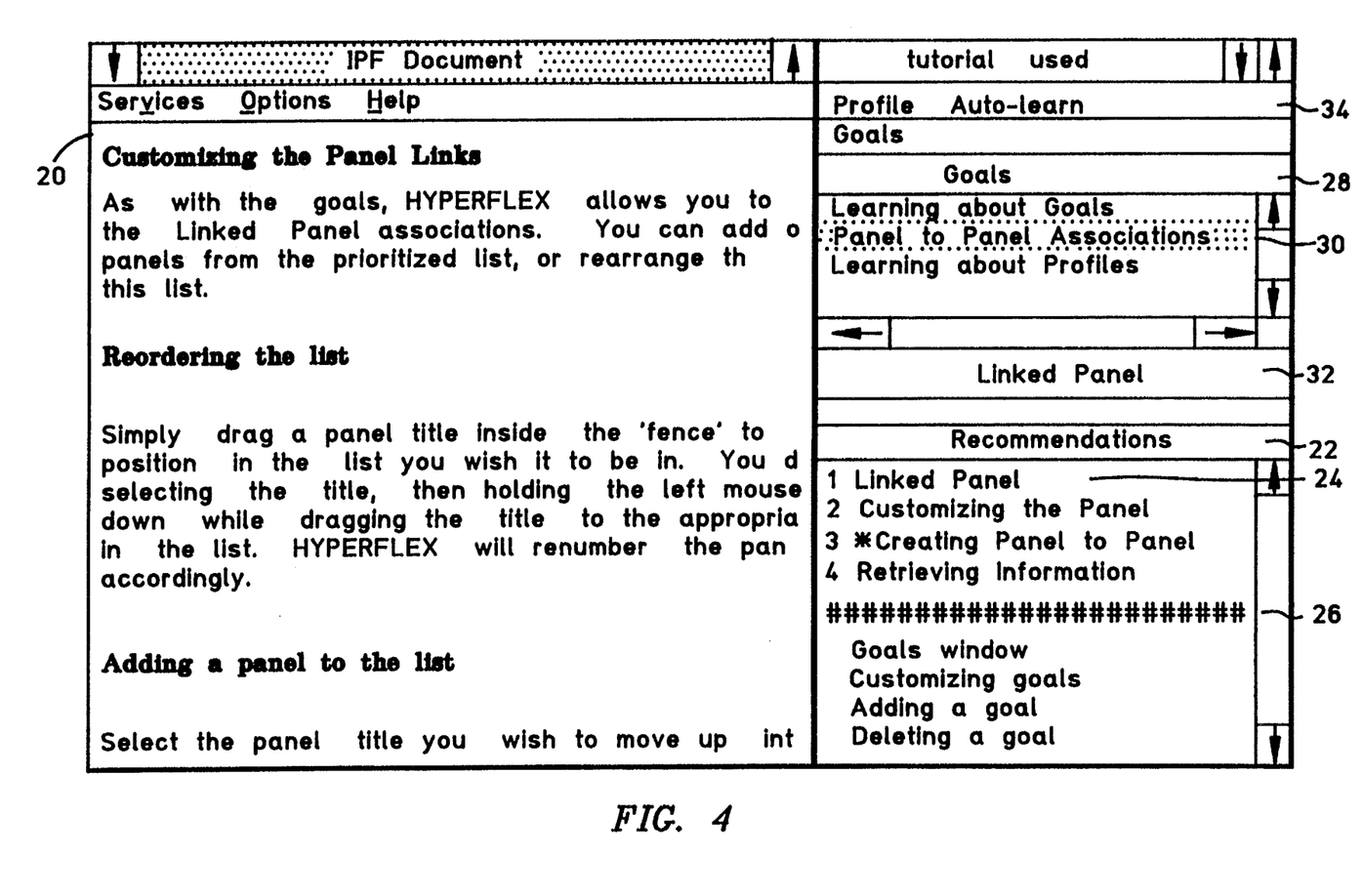
FIG. 4 provides an illustrative embodiment of the HYPERFLEX interface of this invention.
Figure 7:
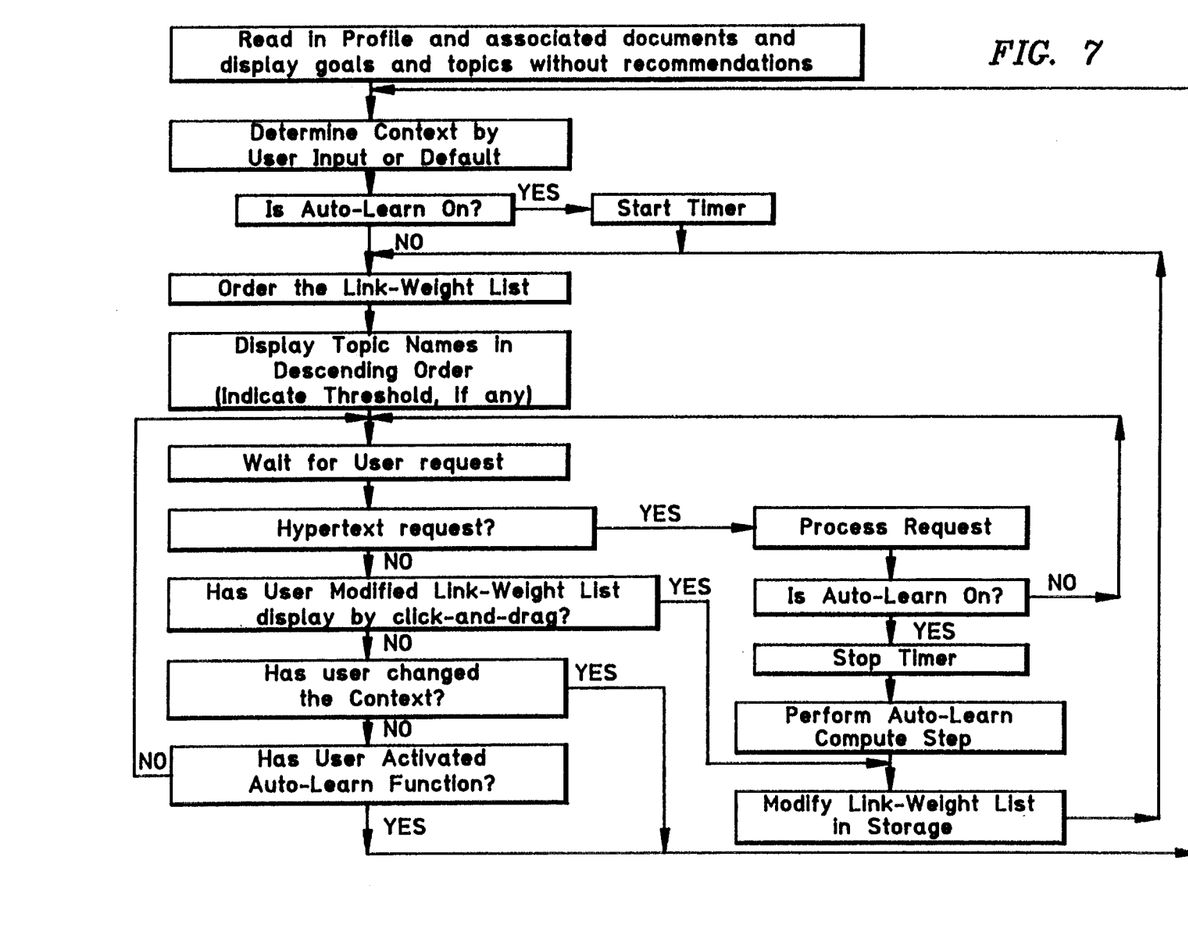
FIG. 7 provides a procedural diagram illustrating the functional steps of the HYPERFLEX embodiment of this invention.

Operation of the Preferred Embodiment:

The following discussion relates to the flow chart provided in FIG. 7 and to an illustrative user interface screen shown in FIG. 4 for the preferred embodiment of this invention, herein denominated the HYPERFLEX system. The procedural flow of the HYPERFLEX embodiment is presented in FIG. 7. An illustration of the Autolearn function of this invention is included in FIG. 7.

The inventors developed the HYPERFLEX prototype of this invention as a smart hypertext system that learns. HYPERFLEX combined elements from an existing IBM hypertext product known as the Information Presentation Facility (IPF) (reference is made to the Information Presentation Facility section of the *OS/2 Version 1.2 Programming Guide*, IBM Corp. (1989)) with a special software implementation of an intelligent advisory system developed using Digitalk's SMALLTALK programming language (reference is made to *SMALLTALK/VPM Object-Oriented Programming System*, Digitalk, Inc., Los Angeles, Calif. (1989)).

Figure 5:
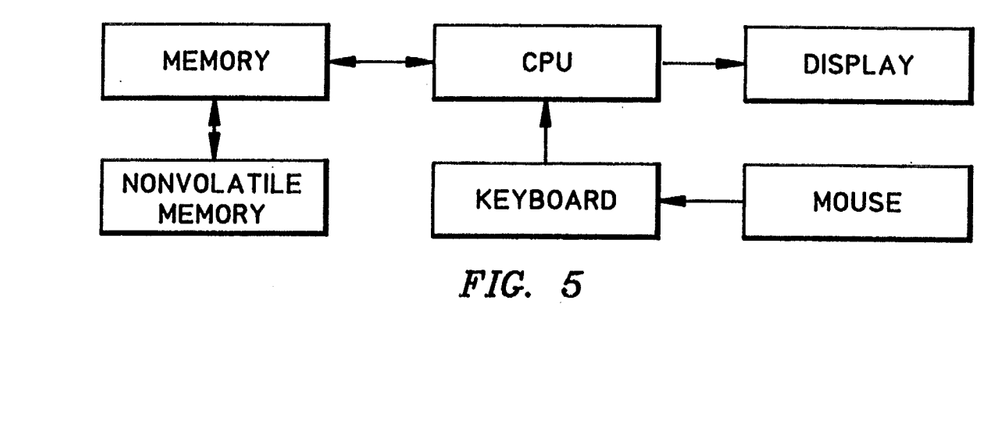
FIG. 5 shows an illustrative embodiment of the hardware system of this invention.
Figure 6:
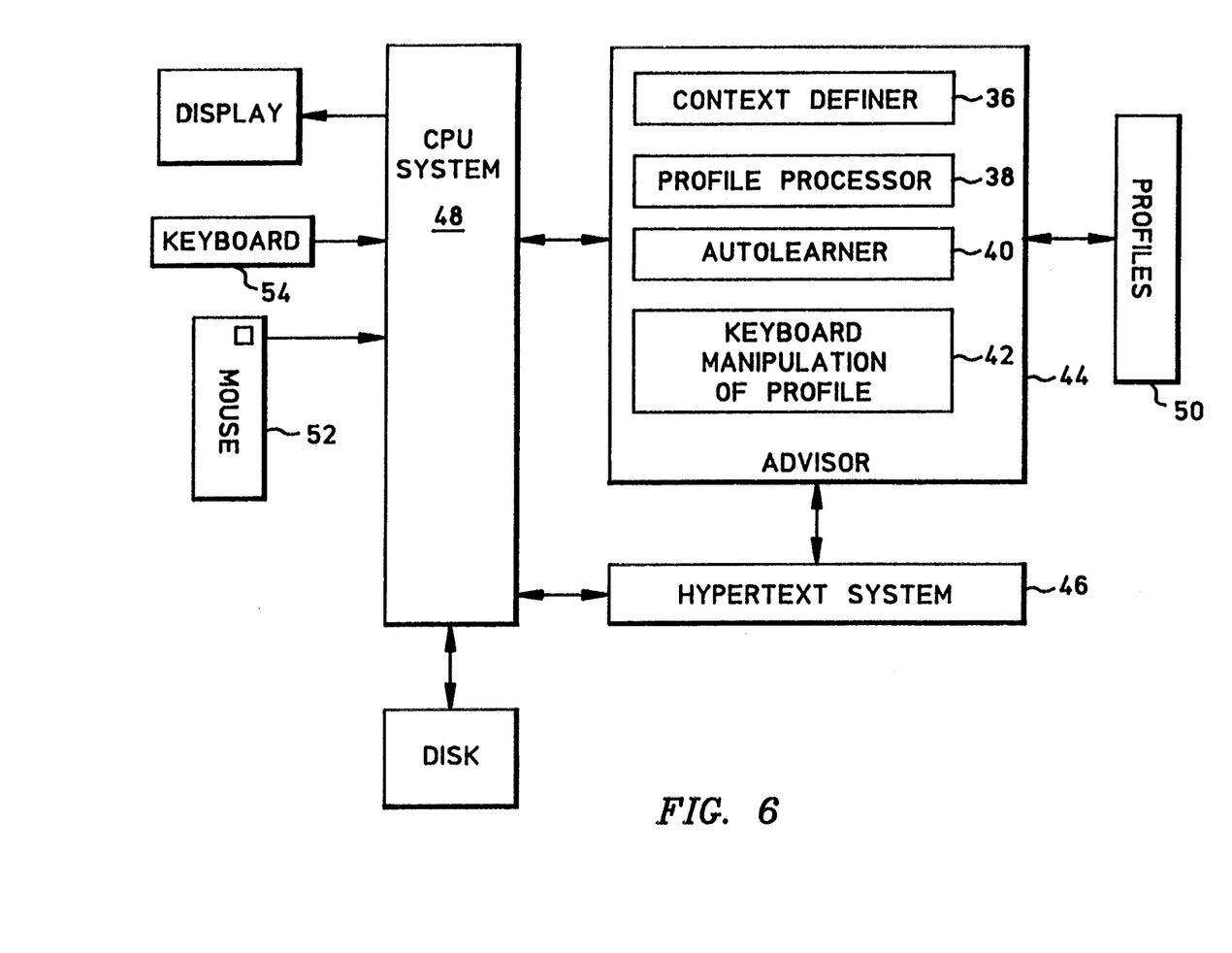
FIG. 6 shows an illustrative embodiment of the computer system modules of this invention.

HYPERFLEX allows authors to create documents containing "panels" of information having arbitrary length. These panels can contain text or graphics. HYPERFLEX is maximally flexible in that users may link from any panel to any other panel in a document. FIG. 5 provides an illustration of the hardware elements suitable for implementing the HYPERFLEX embodiment of this invention. FIG. 6 provides an alternative illustration of the computer system elements embraced by the HYPERFLEX embodiment.

FIG. 4 shows an illustrative user interface for HYPERFLEX. The large window 20 displays the "current panel" viewed by the user. Users can jump to any other panel in the document by selecting the title of another panel from the Recommendations window 22. The panel titles may consist of any desired identifier extracted from the data object at the node representing the desired text panel typified by panel title 24 ("1. Linked Panel"). The user establishes a "context" by first selecting a topic and/or goal before HYPERFLEX can make any recommendations. This "context" can also be determined by any suitable default scheme.

HYPERFLEX is a "smart" hypertext system because recommended panels are listed in rank order at the top of Recommendations window 22. For example, the four items listed above the threshold line 26 are titles of panels recommended by the system. The user is free to ignore these recommendations and the lower part of Recommendations window 22 may be scrolled upward to reveal a list of every panel in the document, most of which are not sufficiently related to the panel displayed in large window 20 to be selected as recommendations. The user may "teach" the system by moving any of these panels to a new list position by "clicking and dragging" with a mouse input device in a fashion commonly known in the computer art.

Referring to FIG. 7 for a summary of the HYPERFLEX procedure, note that HYPERFLEX recommends panels to the user according to both the relationship with either a selected panel, the goals of the user, or both; that is, according to a "context". These factors can be considered by way of the small windows and menus appearing above Recommendations window 22 in FIG. 4.

The Goals window 28 lists goals or tasks associated with a document. In FIG. 4, the selected goal 30 appears in reverse video. The top four panels listed in Recommendations window 22 are those panels that HYPERFLEX finds to be associated with learning more about selected goal 30. Moreover, the four listed panels are ranked according to the strength of the associations with selected goal 30. Such information concerning association strength is stored in a simple goal-to-panel profile such as matrix 14 in FIG. 2.

The recommendations in Recommendations window 22 can be based solely on selected goal 30, or a user may also request that such recommendations relate instead to the contents of a particular panel of interest. By selecting any panel title in Recommendations window 22 and then selecting the Linked Panel window 32, the user causes the selected panel title (not shown) to appear in Linked Panel window 32. HYPERFLEX then limits its recommendations to those based on the strength of association between the "linked panel" and other panels in the system.

For example, if the panel title "adding a goal" is selected and made a linked panel, HYPERFLEX recommends other panels that are related to "adding a goal" and ranks them at the top of Recommendations window 22 in numerical order. These HYPERFLEX recommendations are based on a simple panel-to-panel profile such as matrix 10 in FIG. 1.

For recommendations based both on selected goal 30 and a linked panel listing in Linked Panel window 32, the user merely selects both a goal and a linked panel. In such case, the recommendations in Recommendations window 22 are listed in numerical rank according to the union of the sets of recommendations that would have appeared for either goal or linked panel alone. The recommendation ranking will place panels strongly associated to both at the top and others lower in the list according to the simple matrix merging procedure disclosed hereinafter.

The user can also educate the system about new goals and teach new associations between existing goals and panels. Selecting or adding a goal is one way to change the "context". To add a new goal to his user profile, the user selects the goals function in Command Menu window 34 (FIG. 4) and then types in whatever goal is desired. HYPERFLEX treats this new information as a "node" in the hypertext document with the special property of being a "goal node". A new link vector consisting of a row of link-weight values for the new goal is added to the goal-panel link matrix (matrix 14 in FIG. 2). The link-weight values contained in the new link vector are thereafter modified when HYPERFLEX begins creating associations between the new goal and panels as the user interacts with the system either through direct manipulation by the user or through the Autolearn mode with the new goal selected.

HYPERFLEX user profiles are implemented with associative matrices not unlike those used in neural networks, each element being a link-weight value. Because each panel is linked to all other panels in the document as well as to data object nodes representing specific task goals created by the user, updating a user profile involves updating the two distinct link matrices typified in FIGS. 1 and 2. When a user selects goal 30 in Goal window 28 (FIG. 4), the HYPERFLEX recommendations in Recommendations window 22 are developed by using only the matrix relating panels to goals (matrix 14 in FIG. 2). When the user selects a link panel in Linked Panel window 32, and does not select goal 30, HYPERFLEX develops recommendations using only the matrix relating panels to panels (matrix 10 in FIG. 1). When the rankings of recommendations in Recommendations window 22 are directly changed by the user, HYPERFLEX updates both matrices individually, according to the necessary changes in link-weight values.

If the user selects both a goal and a panel, HYPERFLEX merely adds the two appropriate link vectors from both matrices 10 and 14 and sorts the link-weight values in the sum vector. When a user, by direct manipulation ("click and drag" with a mouse), moves a panel in the ordered list with both the current panel and the task goals specified, no information is available to correctly attribute the change proportionately between the two corresponding link vectors from matrices 10 and 14. The HYPERFLEX embodiment assumes an equal share between the two vectors. It calculates the change in the sum rank needed in order for the panel to be moved to the desired place in the ordered list and updates each of the two ranking link-weight values in equal proportions. Where a panel is currently ranked in either of the two link vectors at the top or bottom of the list and cannot be further adjusted, the surplus change effect is transferred to the other link vector.

Referring to the illustrative system embodiment of FIG. 6, note that the "Context" definer 36, the profile processor 38, the Autolearner 40 and the keyboard input handler 42 may be considered together as an advisor module 44. Advisor module 44 embraces the functions discussed in detail above in connection with FIG. 4 and is disposed to interact with the hypertext system 46 in association with the Central Processor Unit (CPU) system 48. Hypertext system 46 includes means for storing the data objects making up the hypertext documents used by system. Context definer 36 includes the goals definition function and is responsive to both selected goal 30 (FIG. 4) and linked panels (not shown) within Linked Panel window 32. Profile processor 38 opens, modifies, updates, merges and saves the user profiles stored in a non-volatile profile store 50. Autolearner 40 includes provision for being turned on and off. Keyboard input handler 42 allows the user to "click and drag" any panel in Recommendations window 22 (FIG. 4) to any new priority position and also passes "double-clicks" through to hypertext system 46.

Advisor 44 is connected to hypertext system 46 and non-volatile profile store 50. The remainder of the system in FIG. 6 is substantially similar to the hardware system presented in FIG. 5 except that the mouse 52 is shown independent of keyboard 54, which is an alternative embodiment of the combined mouse/keyboard shown in FIG. 5.

In summary, the HYPERFLEX embodiment provides features permitting a user to jump from any panel to any other panel directly, or according to recommendations based on user goals, panels of known interest, or both panels of interest and user goals. Users may add new goals dynamically. Individual user profiles are maintained to capture the unique interests of individual users, and user profiles can be merged to create new group profiles. The Autolearn mode permits the system to observe user actions and learn by inference. The teaching mode allows the user to specify system behavior directly. Finally, both system behavior and learning features are based on very simple models of user requirements.

The HYPERFLEX Auto-Learn Command:

The HYPERFLEX embodiment acquires knowledge through a learning process and updates this knowledge over time. The user can select the Autolearn feature in Command Menu window 34 to activate the adaptive learning features of HYPERFLEX. When Autolearn is selected, HYPERFLEX begins immediately to create associations between selected goal 30 or a linked panel listing in Linked Panel window 32 and whatever subsequent panels are visited by the user through selection and display in large window 20. The strength of these associations is in direct proportion to the amount of time the user spends viewing each panel displayed in large window 20. Because some panels contain more text than others, a normalized measure of time per line of text is used rather than absolute time. FIG. 7 illustrates the procedural steps of the Autolearn function.

For example, if a user selects a goal of "learning about goals" in Goals window 28, the Autolearn function will automatically associate to this goal all subsequent panels selected by the user for viewing in large window 20. The goal-panel association matrix portion of the respective user profile will be modified by the system to increase the link-weight values relating to the "learning about goals" goal and the viewed panels. Moreover, the link-weight values will be higher for those panels that are longer viewed by the user. Those panels viewed longest by the user will eventually appear on HYPERFLEX's list of recommended panels in Recommendations window 22 whenever the goal "learning about goals" is again selected.

Autolearn has the advantage of being an automatic learning mode but also presents certain obvious difficulties. For instance, the user may select the wrong panel accidentally. The user may also be interrupted or take a coffee break during the viewing of a panel under the Autolearn option. In such cases, HYPERFLEX will erroneously conclude that the user has an insatiable curiosity about whatever panel happens to be on display when the user is interrupted.

The direct or teaching mode is included in the HYPERFLEX system to cope with such difficulties as well as to provide a more direct method of teaching HYPERFLEX quickly. With this feature, the user may at any time drag the panel titles from Recommendation window 22 to any position on the recommended list, either above or below threshold line 26. When the user changes the position of recommended panel titles, the HYPERFLEX system automatically updates the relevant associative matrices to reflect the new link-weight values.

For example, the user may select a goal of "learning about goals" and then drag "goals window", "customizing goals" and "adding a goal" from below to above threshold line 26. HYPERFLEX would then create new associations between the selected goals and these panels. The strength of these associations, as reflected in the link-weight values stored in the goal-panel matrix portion of the relevant user profile will reflect the list location to which the user chooses to drag each panel title.

HYPERFLEX can create new user profiles by merging existing profiles according to the merging procedures disclosed hereinafter. For example, a departmental profile can be created which reflects the weighted average associations of all department members together with all member goals. Such profiles may be loaded, merged or saved by selecting the profile menu option in the Command Menu window 34. After selecting the profile option, other windows and instructions appear to the user according to the profile merging methods of this invention described hereinafter.

User Profile Merging Procedures:

Information about the identity and preferences of a user is captured in a user profile. The HYPERFLEX system uses the user identity only in connection with distinguishing the user's set of goals and/or topic associations from those of another user. Thus, user profiles differ structurally from one another only in these respects. A particular hypertext document may have many different user profiles, each reflecting the associations of a different user and each leading to different recommendations.

Different user profiles for the same hypertext document may be merged by the methods of this invention to combine different users' knowledge and preferences. A user may select the profiles desired for combination and may also specify the relative weight of importance assigned to each of the profiles. HYPERFLEX computes a weighted average over the different profiles for each of the link vectors in the two topic and goal matrices 10 and 14. Each link vector is a list of link-weight values for all panels linked to the particular current panel or goal associated with the link vector.

An additional feature of this invention is necessary to avoid errors arising from the "missing panel" problem. As some hypertext systems may grow with time, different user profiles may contain different numbers of panels. That is, an older user profile A may contain link vectors that do not include link-weight values linking the associated panel to a number of the newer panels or goals that were added to the system since user A last signed on. Thus, corresponding link vectors in different profiles for the same current panel or task goal may have different maximal rank values as well as different vector lengths. To ensure meaningful comparison between user profiles, all link vectors are normalized to a standard scale before averaging. Also, to accommodate different vector lengths, the weighted average of the ranks of a target panel is computed across only those profiles that contain references to that panel and the result is adjusted by the total weights of such profiles. This can be understood from the following symbolic discussion.

Let $R_{ijp}$ denote the normalized link-weight value (rank) of panel j given current panel i or task goal i in profile p. Let $W_p$ denote the weight assigned to profile p. Let P denote the set of profiles that contains both panels i and j. According to the preferred HYPERFLEX embodiment of this invention, the weighted average of the normalized link-weight value (rank) is:

$$R_{ij} = R_{ijp} = \Sigma_p R_{ijp} * W_p / \Sigma_p W_p \text{ (for p in P)}$$

HYPERFLEX then sorts the computed weighted averages of all target panels. That is, it sorts across all j's for each current panel or goal i and reassigns ordered link-weight values to link vectors in the new combined profile.

The HYPERFLEX embodiment also provides for maintenance of an incrementally adaptive system default profile for a hypertext document. This system profile captures the knowledge and experience of active users by maintaining a moving average of the link vectors in recently invoked user profiles. The algorithms for merging new user profiles is based on a Most Recently Used (MRU) strategy.

The merge procedure is similar to that of the selective merge of user profiles just described, but the relative weights given to the current system profile and the new user profile to be merged into the current system profile are predetermined. HYPERFLEX maintains a constant, K, which is the inverse of the weight given to a new user profile to be added to the system profile. This constant K also reflects the size of the initial pool of user profiles needed to establish a reasonable moving average system profile. The system monitors the value of N, which is the number of updates (the number of times that some user profile was added to the system profile) already made to the incrementally adaptive system profile.

Let R denote the normalized link matrix of the system profile. Let R1 denote the normalized link matrix of a user profile to be added to the system profile. To build the initial system profile average, when $N<K$, the method of this invention is to update R according to the formula:

$$R = (R*N + R1) / (N+1)$$

After the initial system profile is established and $N<K$, the normalized link matrix is updated according to the formula:

$$R = (R*(K-1) + R1)/K$$

At any point in its history, the adaptive system profile R is a weighted average of the entire collection of user profiles added throughout its history. Older user profiles are down-weighted exponentially by a factor of $(K-1)/K$ each time a new one is added, and the total weights of all user profiles always add up to unity. Index subscripts for panels and goals were excluded from the two formulas but the same missing panel normalization scheme discussed above can be used to avoid errors resulting from missing panels.

HYPERFLEX maintains two versions of an adaptive system profile. A real-valued version of the normalized link profile is maintained for incremental updating to avoid significant round-off errors. The updated link profile is then sorted and converted into a standard rank order matrix after every update and the new system profile is then made available to users.

Clearly, other embodiments and modifications of this invention will occur readily to those of ordinary skill in the art in view of this teachings. Therefore, this invention is to be limited only by the following claims, which include all such obvious embodiments and modifications when viewed in conjunction with the above specification and accompanying drawings.

We claim:

1. A computer-implemented hypertext system comprising:
   display means for displaying images and text;
   keyboard means for accepting user commands;
   memory means for storing a plurality of data objects including user goal objects and text panel objects organized to form at least one hypertext object;
   profile storage means for storing at least one link profile each associated with a specific set of one or more users and containing a plurality of link vectors each containing a plurality of numerical link-weights each representing an associated user activity relationship between two said data objects; and
   advisor means for creating an ordered list of one or more said data objects responsive to user input activity, said list being ordered in accordance with the relative values of said numerical link-weights representing said user input activity.

2. The system of claim 1 wherein said advisor means further comprises:
   context definer means for selecting a link vector from a user profile responsive to said user input activity.

3. The system of claim 2 wherein said advisor means further comprises:
   clock means for indicating elapsed time; and
   autolearner means for updating a user profile responsive to the data object selection activity and said elapsed time associated with said user input activity.

4. The system of claim 3 wherein said advisor means further comprises:
   profile processor means for combining a first plurality of said link profiles to form one or more new link profiles each associated with a combined set of users including users associated with link profiles from said first link profile plurality.

5. The system of claim 1 wherein said advisor means further comprises:
   clock means for indicating elapsed time; and
   autolearner means, within said advisor means for updating a user profile responsive to the data object selection and viewing time associated with said user input activity.

6. The system of claim 1 wherein said advisor means further comprises:
   profile processor means for combining a first plurality of said link profiles to form one or more new link profiles each associated with a combined set of users including users associated with link profiles from said first link profile plurality.

7. A method for operating a computer-implemented object-oriented hypertext system having a plurality of link profiles each associated with a specific set of one or more users and containing a plurality of link vectors each containing a plurality of numerical link-weights, each said link-weight representing an associated user activity relationship between one of a plurality of data objects and another one of said plurality of data objects, said plurality of data objects including text panel objects and user goal objects, said system also having display means for displaying images and text, keyboard means for accepting user commands, and at least one memory means for storing said data objects and link profiles, said method comprising the steps of:

(a) selecting a first link profile having a first link vector corresponding to a first data object, wherein said first data object is either a text panel object or a user goal object;

(b) displaying at least part of said first data object on said display means responsive to said keyboard means;

(c) comparing the link-weights within said first link vector to find a maximum link-weight value; and (d) displaying on said display means at least part of a second data object corresponding to said maximum-valued link-weight, wherein said second data object is a text panel object.

8. The method of claim 7 further comprising the steps of:
   (e) sorting into numerical order said link-weights in said first link vector; and
   (f) displaying at least one identifier from each of one or more said data objects and the associated link-weight ordering for each said identifier displayed.

9. The method of claim 8 wherein said displaying step (f) further the comprises the step of:
   (f.1) displaying said one or more displayed identifiers in order of the value of said associated link-weight.

10. The method of claim 9 further comprising the steps of:
    (g) comparing said associated link-weight values in said first link vector with a threshold value; and
    (h) displaying said identifiers for data objects associated with link-weight values greater than said threshold value.

11. The method of claim 8 further comprising the step of:
    (g) changing the link-weight value associated with a selected data object responsive to user input activity at said keyboard means, whereby the sort order of said displayed identifiers is changed responsive to said user input activity.

12. The method of claim 7 wherein said selecting step (a) further comprises the steps of:
    (a.1) merging a first plurality of said link profiles to form a combined link profile associated with a combined set of users including each user associated with a link profile from said first link profile plurality; and
    (a.2) selecting said combined link profile to be said first link profile.

13. The method of claim 12 wherein said merging step (a.1) further comprises the steps of:
    (a.1.1) calculating the link-weight values for a system link profile R by merging the link-weight values of a new link profile $R_n$ with the corresponding link-weight values of an existing system link profile $R_e$ according to the formula, $R=(R_e*(K-1)+R_n)/K$, where K is a predetermined constant; and
    (a.1.2) storing said link-weight values for said system link profile R in said memory means.

14. The method of claim 13 wherein said calculating step (a.1.1) further comprises the step of:
    (a.1.1.1) initializing said link-weight values in said system link profile R by merging a new link profile $R_n$ to an existing system link profile Re according to the formula, $R=(R_e*N+R_n)/(N+1)$, where $N<K$ and N is the number of profiles that have been previously merged to form said existing system link profile $R_e$.

15. The method of claim 12 wherein said merging step (a.1) further comprises the steps of:

(a.1.1) calculating, for each link between data objects j and i, a normalized link-weight value $R_{ij}$ representing the corresponding link-weight value for the merger of a set of link profiles, by first assigning a profile weight $W_p$ to the $p^{th}$ said link profile in a subset (ij) of said set and then averaging said subset (ij) according to the formula $R_{ij} = \Sigma_p (R_{ijp} * W_p) / \Sigma_p W_p$, where said subset (ij) excludes all said link profiles in said set that do not contain a link-weight value relating data objects j and i; and (a.1.2) storing said normalized link-weight values $R_{ij}$ in said combined link profile in said memory means.

16. The method of claim 1 further comprising the steps of:

(e) modifying said first link profile responsive to user activity at said keyboard means; and (f) storing said modified first link profile in said memory means.

17. A method for operating a computer-implemented object-oriented hypertext system having a plurality of link profiles each associated with a specific set of one or more users and containing a plurality of link vectors each containing a plurality of numerical link-weights, each said link-weight representing an associated user activity relationship between one of a plurality of data objects and another one of said plurality of data objects, said plurality of data objects including text panel objects and user goal objects, said system also having display means for displaying images and text, keyboard means for accepting user commands, clock means for indicating elapsed time, and at least one memory means for storing said data objects and link profiles, said method comprising the steps of:

(a) selecting a first link profile having a first link vector corresponding to a first data object and a second link vector corresponding to a second data object, wherein said first data object is either a text panel object or a user goal object and said second data object is a text panel object;

(b) displaying at least part of said first data object on said display means;

(c) displaying at least part of said second data object on said display means responsive to user activity at said keyboard means;

(d) recording a start time from said clock means to begin measurement of an elapsed time interval;

(e) monitoring for a predetermined event signaling that said elapsed time interval should end;

(f) recording a stop time from said clock means to complete said measurement of said elapsed time interval;

(g) computing a view time for said second data object by subtracting said start time from said stop time;

(h) calculating a new link-weight value representing said associated user activity relationship between said first data object and said second data object, said new link-weight value being at least partly proportional to said view time; and (i) storing said new link-weight value in said first link profile in said memory means.

18. The method of claim 17 further comprising the steps of:

(j) comparing the link-weights within said second link vector to find a maximum link-weight value; and (k) displaying at least part of a third data object corresponding to said maximum-valued link-weight, wherein said third data object is a text panel object.

19. The method of claim 18 further comprising the steps of:

(l) sorting into numerical order said link-weights in said second link vector; and (m) displaying an identifier for each of one or more corresponding said text panel objects, said identifier including the associated link-weight ordering for said each corresponding text panel object.

20. The method of claim 19 wherein said displaying step (m) further comprises the step of:

(m.1) displaying said identifiers in order of the value of said associated link-weight.

21. The method of claim 20 further comprising the steps of:

(n) comparing said associated link-weight values in said second link vector with a threshold value; and (o) displaying only said identifiers for said corresponding text panel objects associated with link-weight values greater than said threshold value.

22. The method of claim 19 further comprising the steps of:

(n) modifying said first link profile responsive to user activity at said keyboard means; and (o) storing said modified first link profile in said memory means.

23. The method of claim 17 wherein said selecting step (a) further comprises the steps of:

(a.1) merging a first plurality of said link profiles to form a combined link profile associated with a combined set of users including each user associated with a link profile from said first link profile plurality; and (a.2) selecting said combined link profile to be said first link profile.

24. The method of claim 23 wherein said merging step (a.1) further comprises the steps of:

(a.1.1) calculating the link-weight values for a system link profile R by merging the link-weight values of a new link profile $R_n$ with the corresponding link-weight values of an existing system link profile $R_e$ according to the formula, $R = (R_e * (K-1) + R_n)/K$, where K is a predetermined constant; and (a.1.2) storing said link-weight values for said system link profile R in said memory means.

25. The method of claim 24 wherein said calculating step (a.1.1) further comprises the step of:

(a.1.1.1) initializing said link-weight values in said system link profile R by merging a new link profile $R_n$ to an existing system link profile $R_e$ according to the formula, $R = (R_e * N + R_n)/(N+1)$, where $N < K$ and N is the number of profiles that have been previously merged to form said existing system link profile $R_e$.

26. The method of claim 23 wherein said merging step (a.1) further comprises the steps of:

(a.1.1) calculating, for each link between said first and second data objects j and i, a normalized link-weight value $R_{ij}$ representing the corresponding link-weight value for the merger of a set of link profiles, by first assigning a profile weight $W_p$ to the $p^{th}$ said link profile in a subset (ij) of said set and then averaging said subset (ij) according to the formula, $R_{ij} = \Sigma_p (R_{ijp} * W_p)/\Sigma_p W_p$, where said subset (ij) excludes all said link profiles in said set that do not contain a link-weight value relating said first and second data objects j and i; and (a.1.2) storing said normalized link-weight values $R_{ij}$ in said combined link profile in said memory means.

27. The method of claim 17 wherein said monitoring step (e) further comprises the step of:
   (e.1) monitoring for an input signal from said keyboard means representing user activity.

28. The method of claim 17 wherein said calculating step (h) further comprises the step of:
   (h.1) recalculating said new link-weight value to be at least partly inversely proportional to the quantity of data contained in said second data object.

29. A combination for use with a computer-implemented hypertext system, said combination including display means for displaying images and text and a program medium for storing program and data objects and structures comprising:
   a program object structure stored in said program medium, said program object structure including a plurality of program objects including:
      a program object for controlling said hypertext system including a plurality of link profiles each associated with a specific set of one or more users, each said link profile containing a plurality of link vectors each containing a plurality of numerical link-weights, each said link-weight representing an associated user activity relationship between one of a first plurality of said data objects and another one of said first plurality of data objects, said first plurality of data objects including text panel objects and user goal objects;
      a display program object for controlling the display of images and text on said display means;
      a program object for controlling a clock means for indicating elapsed time;
      a program object for controlling a selection of a first link profile having a first link vector corresponding to a first data object and a second link vector corresponding to a second data object, wherein said first data object is either a text panel object or a user goal object and said second data object is a text panel object; and
      a plurality of said program objects including an object for displaying at least part of said first data object on said display means, an object for displaying at least part of said second data object on said display means responsive to user activity at said keyboard means, an object for recording a start time from said clock means to begin measurement of an elapsed time interval, an object for monitoring for a predetermined event signaling that said elapsed time interval should end, an object for recording a stop time from said clock means to complete said measurement of said elapsed time interval, an object for computing a view time for said second data object by subtracting said start time from said stop time, an object for calculating a new link-weight value representing said associated user activity relationship between said first data object and said second data object, wherein said new link-weight value is at least partly proportional to said view time, and an object for controlling the storing of said new link-weight value in said first link profile data object.

* * * * *